Dec. 13, 1960  F. E. SNOW ET AL  2,963,736
APPLICATOR AND MIXER FOR VISCOUS MATERIALS
Original Filed July 28, 1952  9 Sheets-Sheet 1

INVENTORS
FLOYD E. SNOW
JONES O. YORK
BY
Flam and Flam
ATTORNEY

Dec. 13, 1960  F. E. SNOW ET AL  2,963,736
APPLICATOR AND MIXER FOR VISCOUS MATERIALS
Original Filed July 28, 1952

INVENTORS
FLOYD E. SNOW
JONES O. YORK
BY
*Flam and Flam*
ATTORNEY

Dec. 13, 1960  F. E. SNOW ET AL  2,963,736
APPLICATOR AND MIXER FOR VISCOUS MATERIALS
Original Filed July 28, 1952  9 Sheets-Sheet 4

Fig. 9.

INVENTORS
FLOYD E. SNOW
JONES O. YORK
BY
Flam and Flam
ATTORNEY

Dec. 13, 1960     F. E. SNOW ET AL     2,963,736
APPLICATOR AND MIXER FOR VISCOUS MATERIALS
Original Filed July 28, 1952     9 Sheets-Sheet 5

INVENTORS
FLOYD E. SNOW
JONES O. YORK
BY
Flam and Flam
ATTORNEY

Dec. 13, 1960   F. E. SNOW ET AL   2,963,736
APPLICATOR AND MIXER FOR VISCOUS MATERIALS
Original Filed July 28, 1952   9 Sheets-Sheet 6

INVENTORS
FLOYD E. SNOW
JONES O. YORK
BY

ATTORNEY

Dec. 13, 1960   F. E. SNOW ET AL   2,963,736
APPLICATOR AND MIXER FOR VISCOUS MATERIALS
Original Filed July 28, 1952   9 Sheets-Sheet 7

INVENTORS
FLOYD E. SNOW
JONES O. YORK
BY
Flam and Flam
ATTORNEY

Dec. 13, 1960   F. E. SNOW ET AL   2,963,736
APPLICATOR AND MIXER FOR VISCOUS MATERIALS
Original Filed July 28, 1952   9 Sheets-Sheet 8

INVENTORS
FLOYD E. SNOW
JONES O. YORK
BY
Flam and Flam
ATTORNEY

Dec. 13, 1960   F. E. SNOW ET AL   2,963,736
APPLICATOR AND MIXER FOR VISCOUS MATERIALS
Original Filed July 28, 1952   9 Sheets-Sheet 9

INVENTORS
FLOYD E. SNOW
JONES O. YORK
BY Flam and Flam
ATTORNEY

United States Patent Office 2,963,736
Patented Dec. 13, 1960

2,963,736

APPLICATOR AND MIXER FOR VISCOUS MATERIALS

Floyd E. Snow, Pasadena, and Jones O. York, Burbank, Calif., assignors, by mesne assignments, to Coast Pro-Seal Mfg. Co., Los Angeles, Calif., a corporation of California Original application July 28, 1952, Ser. No. 301,174, now Patent No. 2,814,827, dated Dec. 3, 1957. Divided and this application July 12, 1957, Ser. No. 677,172

9 Claims. (Cl. 18—2)

This invention relates to the application of viscous compounds or mixtures, such as rubber-like sealing compounds.

It is often essential to flow compounds of this character over localities where surfaces are in contact, as, for example, around the flange of a cover plate for airplane gasoline tanks.

Such compounds are also used around bolts and nuts. The compound usually includes rubber-like, tacky material that hardens on exposure to air.

The individual constituents of such a mixture are a rubber material and a catalyzer. When mixed, setting takes place at a slow rate.

In order efficiently to utilize such compounds, they should accordingly be mixed at the time they are to be applied; for, otherwise, setting of the mixture would render them incapable of use.

It is one of the objects of this invention to provide a compact and inexpensive mixer and applicator that performs the essential function of intimate intermixture of the constituent elements at the time the compound is to be used.

It is another object of this invention to provide a structure for the mixer that effectively and intimately associates the catalyzer and rubber material, preferably by a rubbing, as well as a cutting, or comminuting action.

It is still another object of this invention to facilitate the cleaning of the parts, as by ready and rapid removal of these parts. This feature is particularly important, since the materials treated are sticky or gummy.

This application is a division of my application filed July 28, 1952, for Applicator and Mixer for Viscous Materials, now Patent No. 2,814,827, issued December 3, 1957.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
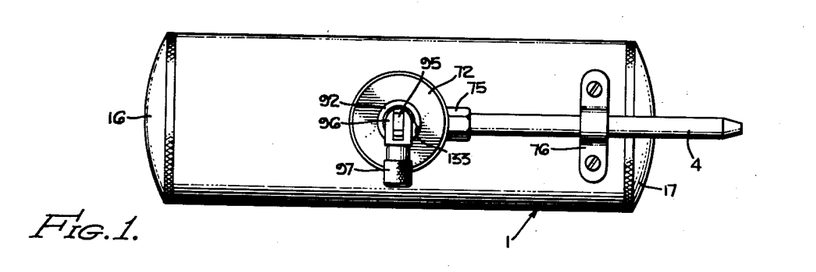
Figure 1 is a plan view of an apparatus incorporating the invention.
Figures 2, 7:
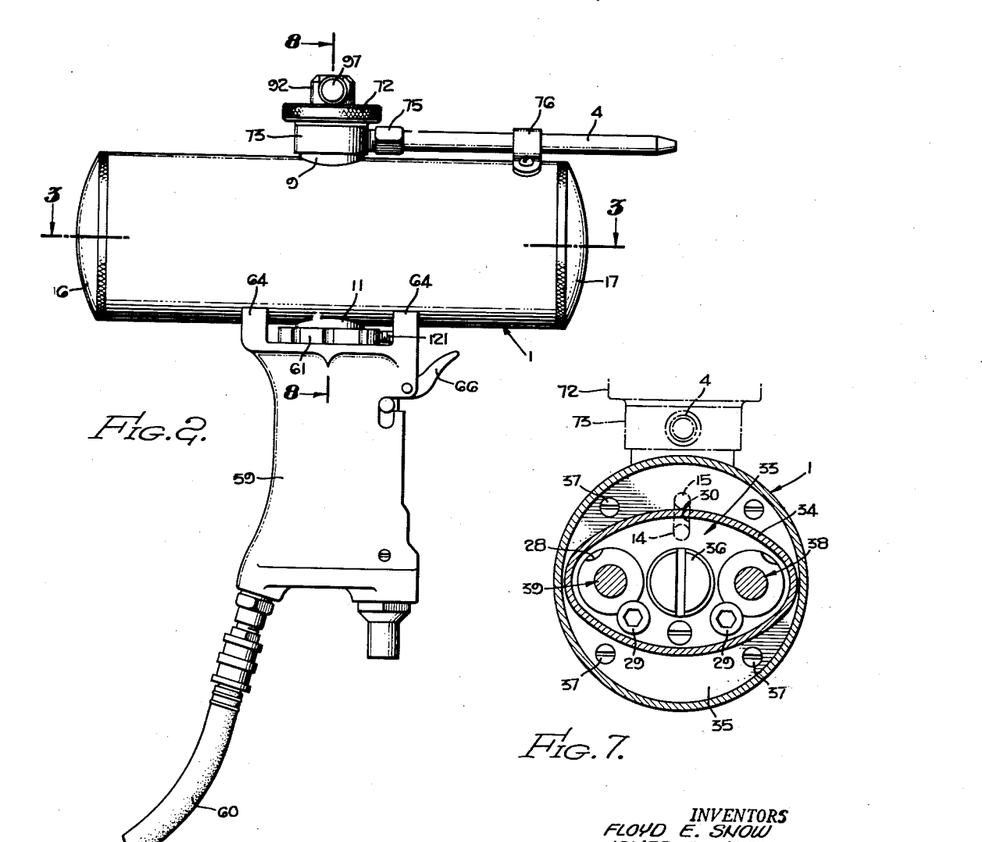
Fig. 2 is a side elevation thereof.
Fig. 7 is a sectional view, similar to Fig. 4, of a modified form of the invention.

The device, as shown in Figs. 1 and 2, includes a barrel 1 of generally hollow cylindrical configuration. This barrel is divided into two cylinder spaces 2 and 3 (Fig. 3) into which the two constituent materials (such as a catalyst and a rubber material) may be placed for ultimate discharge, under pressure exerted in these spaces, through a spout structure 4 (Figs. 1 and 2) mounted on the barrel 1. The intermingling of the materials prior to discharge is effected in a manner to be hereinafter described.

Figure 8:
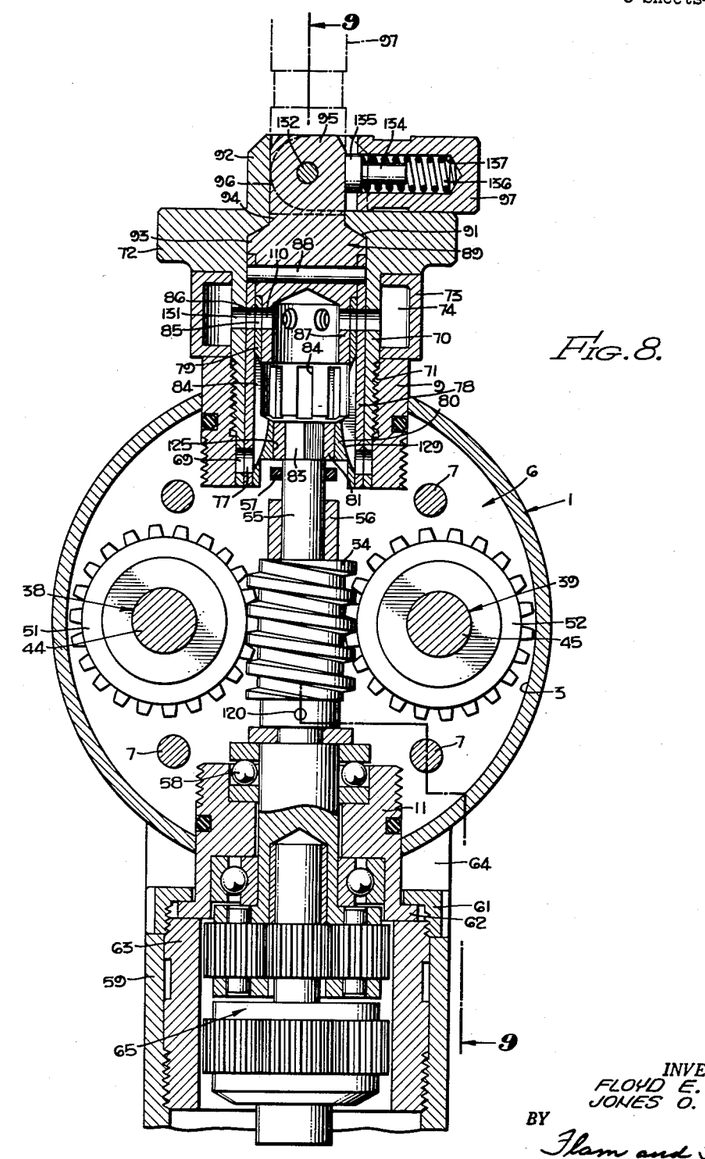
Fig. 8 is an enlarged vertical sectional view, taken along a plane corresponding to line 8—8 of Fig. 2.
Figure 9:
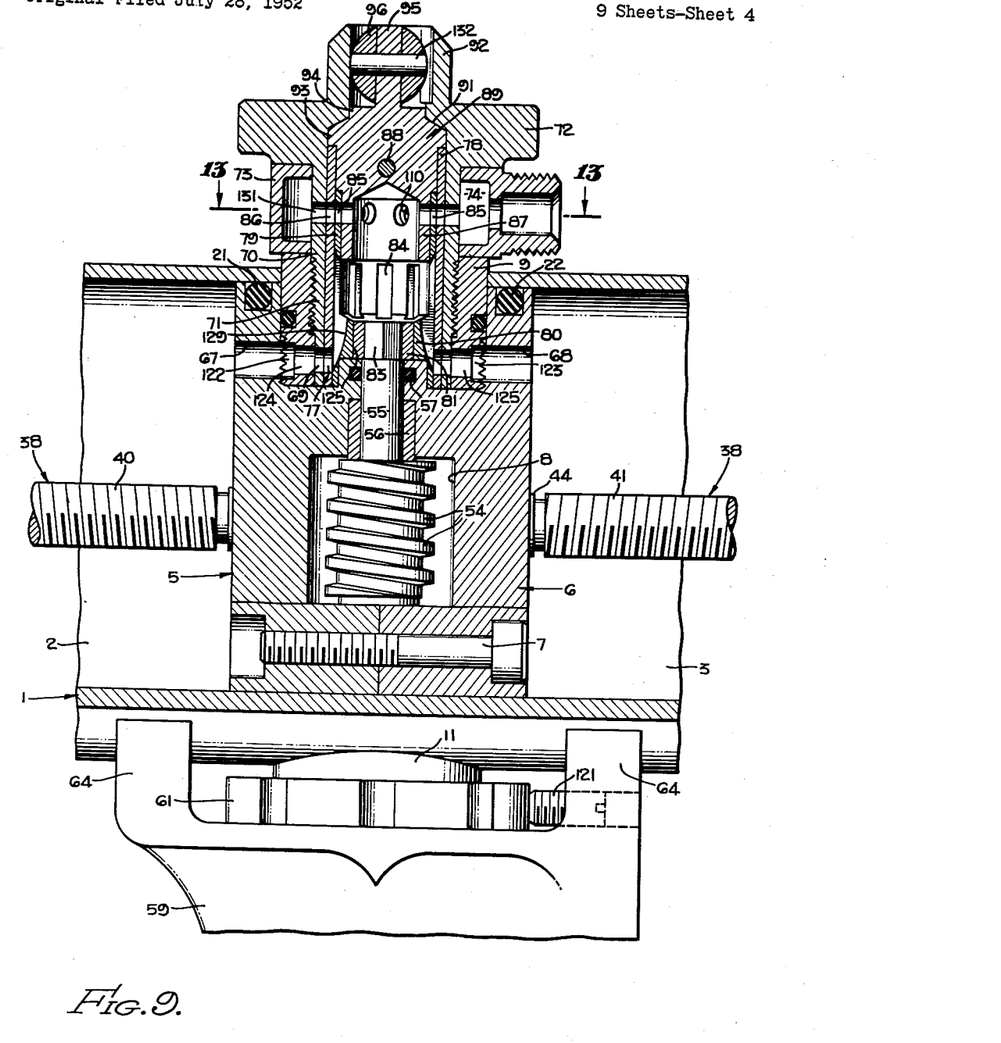
Fig. 9 is a vertical sectional view, taken along a plane corresponding to line 9—9 of Fig. 8.
Figures 10, 11, 12:
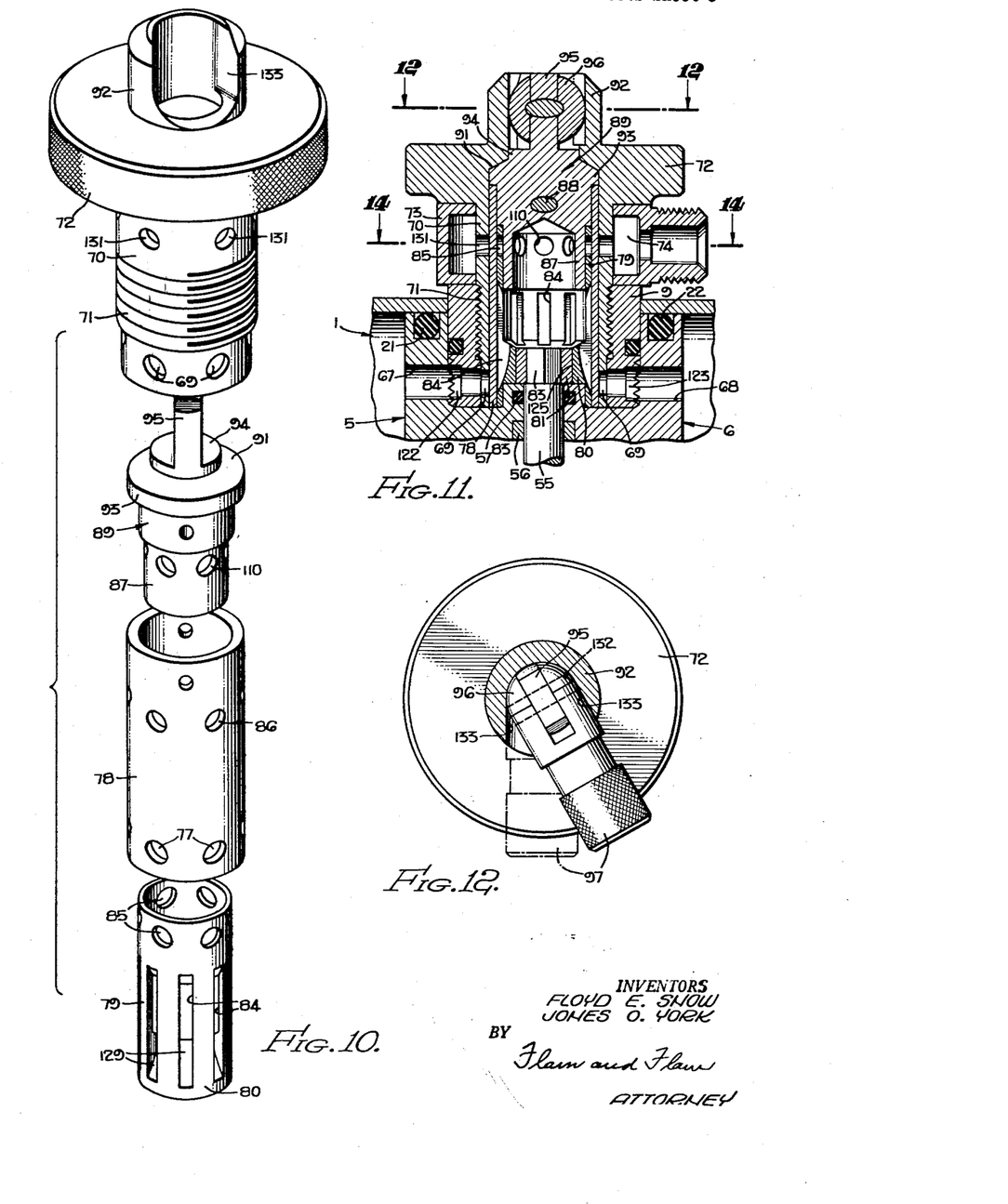
Fig. 10 is an exploded view of the mixing mechanism.
Fig. 11 is a fragmentary view, similar to Fig. 9, but illustrating another position of the apparatus.
Fig. 12 is a sectional view, taken along a plane corresponding to line 12—12 of Fig. 11.

In order to form the cylinder spaces 2 and 3, use is made of an intermediate wall structure comprising the mating halves 5 and 6 (Figs. 8, 9, and 11). These halves are of generally cylindrical configuration to fit the interior of the cylinder barrel 1. They are provided with appropriate mating recesses to define apertures for bearings, etc., all as hereinafter described. The halves 5 and 6 are held together by four screws 7 (Figs. 8 and 9). As shown most clearly in Fig. 9, O-rings 21 and 22 are provided in grooves formed in the peripheries of these halves so as to isolate the cylinder spaces 2 and 3 from each other.

The opposite ends of the inner bore of barrel 1 are each provided with an outward taper for the accommodation of the cover members 16 and 17 (Figs. 1, 2, 3, and 5). These cover members are provided with the flanges 18, 19, respectively telescoping into the ends of the barrel 1 and fastened thereto as by snap rings 10.

Halves 5 and 6 cooperate to define a space 8 in which appropriate mechanism is located for the operation of piston structures in the cylindrical spaces 2 and 3. This mechanism will be described hereinafter.

A threaded bushing 9 (Figs. 2, 8, 9 and 11) is accommodated in a threaded aperture formed by the halves 5 and 6, and is bottomed therein. The axis of this bushing is transverse to the axis of barrel 1. It passes radially into the barrel through an adial aperture, and thus serves to restrain relative axial movement between the barrel 1 and the structure 5–6. It also serves as a main support for the disintegrating and mixing elements.

A similar bushing 11 (Fig. 8) extends coaxially with the bushing 9, at the lower side of the barrel 1, and is similarly threaded into an appropriate threaded aperture formed by the halves 5 and 6. The bushing 11 is bottomed in this threaded aperture.

Two identical piston structures, respectively in the cylinder spaces 2 and 3, are provided for urging the material from these two spaces 2 and 3 through the chopper and mixer mechanism supported by the bushing 9.

These piston structures are shown to best advantage in Figs. 3, 4, 5, and 6.

Figure 4:
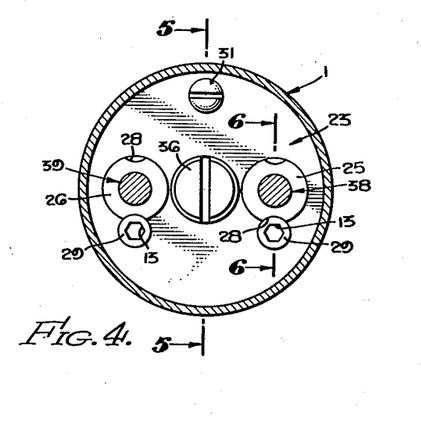
Fig. 4 is a sectional view, taken along a plane corresponding to line 4—4 of Fig. 5.
Figure 5:
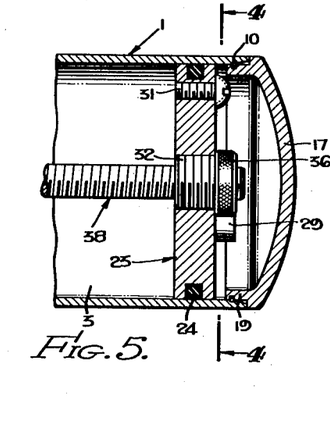
Fig. 5 is a sectional view, taken along a plane corresponding to line 5—5 of Fig. 4.
Figure 6:
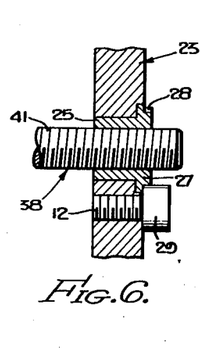
Fig. 6 is a fragmentary enlarged sectional view, taken along a plane corresponding to line 6—6 of Fig. 4.

Each piston structure includes a cylindrical piston proper 23, carrying a sealing O-ring 24 located in a groove in the periphery of the piston. A pair of spaced nuts 25 and 26, having exterior cylindrical surfaces, are telescoped within appropriate apertures in the piston 23. Flanges 27 on these nuts extend partially into counterbores of these apertures. The peripheries of the flanges, as shown most clearly in Figs. 4 and 6, are each provided with a pair of arcuate recesses 28 at diametrically opposite places of the flange. These recesses form plane surfaces coplanar with the end surfaces of the piston 23. Engaging one of these recesses is the cylindrical head 29 of screw 12, threaded in an aperture adjacent the nut 26. This head 29 has a hexagonal recess 13 (Fig. 4) to permit removal and replacement of the screw. In this way, the nuts are prevented from rotating, and they are also restrained against axial movement with respect to the piston 23. The two recesses of each nut 26 make it possible to adjust the angular positions of the nuts by half revolutions.

In order to gain access to the spaces 2 and 3, removable threaded plugs 32 are provided in each of the pistons 23. Knurled and slotted head 36 is provided for manual manipulation.

Thus, to gain access to the spaces 2 and 3 to insert ingredients to be mixed, the covers 16 and 17, as well as the plugs 32, may be removed.

For moving the pistons 23 simultaneously toward the wall 5—6, use is made of a pair of lead screws 38 and 39. These lead screws respectively have two threaded sections 40, 41 and 42, 43. The sections 40 and 41 are of opposite threads, as are the sections 42 and 43. Accordingly, simultaneous rotation of the lead screws will move the pistons 23 toward each other. The rate at which the materials in cylinder spaces 2 and 3 are urged into the bushing 9 is dependent upon the relative pitches of sections 40, 41 and 42, 43. Thus, if the materials are to be delivered in equal amounts, the pitches are equal. Assuming that the material in the left-hand chamber 2 is to be delivered at a faster rate than the material in chamber 3, then, in that event, the pitches of the threaded sections 40 and 42 are made correspondingly greater. Obviously, in this manner any desired ratio of ingredients may be secured.

Another way to adjust the ratio is indicated diagrammatically in Fig. 7. In this instance, the piston 33 has an area less than that of barrel 1. For example, it may be of elliptical cross section, fitting closely within an elliptical insert 34 in barrel 1. This insert has a flange 35 attached to one side of the wall 5—6 (Figs. 3 and 9), as by screws 37. The flange 35 is provided with a groove 30 communicating, at its inner end 14, with the cylinder space formed by insert 34. The outer end 15 of the groove 30 communicates with the mixer mechanism hereinafter to be described.

The lead screws 38 and 39 (Fig. 3) are each provided with a cylindrical shaft portion 44 or 45, located intermediate the threaded sections. These shaft portions are appropriately supported in radial and thrust bearing structures 46, 47, 48, and 49, located in recesses in the wall halves 5 and 6 (Fig. 3) and opening into the space 8. Appropriate O-rings 50 surround the shaft portions 44 and 45, and are located in grooves formed in the halves 5 and 6.

In order to rotate the lead screws 38 and 39, these lead screws are provided with worm wheels 51 and 52 (see also, Fig. 8). These worm wheels may be appropriately joined to the shaft portions 44 and 45 as by the aid of the cross pins 53.

A common driving worm 54 engages both of the worm wheels 51 and 52. This worm is located in the space 8, and is mounted on a shaft 55 coaxial with bushings 9 and 11. Shaft 55 is journaled at its upper end in a busing 56 (Figs. 8, 9, and 11) located in a recess formed by the halves 5 and 6. An O-ring 57 is disposed around the upper end of the shaft 55, and in a groove formed by the two halves 5 and 6.

The worm 54 is shown as coupled to the shaft 55 as by the aid of a cross pin 120 (Fig. 8). The lower threaded bushing 11 provides a rotary thrust bearing support 58 (Fig. 8) for the shaft. This shaft is appropriately driven by an air motor mechanism encased in a hollow handle or housing 59 (Figs. 2, 8, and 9). Air may be supplied to the air motor in the housing 59 by the aid of an air hose 60. The housing 59 is arranged to be held appropriately in place by the aid of a nut structure 61 that has a flange overlapping the lower flange 62 of the bushing 11. It is threaded on a member 63 held in the housing 59. The housing 59 is provided with saddle portions 64 (Figs. 2 and 9) adapted to engage the lower side of the barrel 1. As the nut structure 61 is rotated, these saddle members 64 are urged upwardly into contact with the barrel 1. A set screw 121 extends through one of these saddle members to lock nut 61 against inadvertent rotation.

Interposed between the air motor in the housing 59 and the worm shaft 55 is a planetary reduction gearing 65 (Fig. 8), and which is enclosed in member 63. Since this reduction gearing forms no part of the present invention, further description is unnecessary. It is sufficient to note that the rotation of the air motor is controlled by a trigger 66 (Fig. 2) which may be optionally operated to cause the air motor to rotate in either direction or to stop the air motor. In this way, the pistons 23 may be caused to move in either direction for the mixing operation, as well as for the retraction of the pistons 23 for the purpose of reloading the barrel 1.

The pistons 23 urge the materials to be mixed through appropriate ports formed in the wall halves 5 and 6. As shown most clearly in Fig. 9, wall half 5 has a port 67 communicating with space 2, and wall half 6 has a corresponding port 68 communicating with space 3. These are arranged diametrically opposite each other with respect to the bushing 9. This bushing is also appropriately apertured for the passage of the materials.

Thus, bushing 9 has diametrically opposite ports 122 and 123 aligned respectively with ports 67 and 68 (Fig. 9). These ports are in communication, respectively, with ports 124 and 125 in bushing 9, said ports 124 and 125 having a substantial angular extent about the axis of the bushing.

The materials passing through the ports 67, 68, 122, and 123 can pass through a series of apertures 69 located in the end of a hollow body member 70 (Figs. 8, 9, 10, and 11). This hollow body member 70 has a threaded portion 71 engaging the corresponding internal threads in the bushing 9. This body member is provided with a flanged head 72 which may be knurled (Figs. 2 and 10) for manual assembly with the plug 9.

Interposed between the lower surface of the head 72 and the top of the plug 9 is a collector member 73 (Figs.

2, 8, 9, 11, 13, and 14). This collector member, as will be hereinafter described, provides an annular mixing chamber 74 into which the materials are urged under pressure.

This chamber 74 is placed in communication with the nozzle 4, as by the aid of the coupling 75 (Figs. 1, 2, 13, and 14). This coupling is omitted in Figs. 8 and 9. The nozzle 4 thus receives the discharged intermixed materials. This nozzle may further be supported by the aid of a standard 76 (Figs. 1 and 2) mounted on top of the barrel 1.

As shown most clearly in Figs. 8, 9, and 11, the body 70 is coaxial with the shaft 55.

The materials to be mixed enter by way of ports 67 and 68, and the apertures 69, past another group of apertures 77 (Figs. 8, 9, and 10) in the lower end of a sleeve 78. This sleeve 78 telescopes within the body 70. It is angularly adjustable in order to close the apertures 69 (Fig. 11) or to place these apertures in register with the apertures in sleeve 78 (Fig. 8).

A chopper sleeve member 79 (Figs. 8, 9, 10, 11, 13, and 14) telescopes within the upper end of the sleeve 78, and is shown integral with a lower end wall 80 (Figs. 8, 9, 11, 13, and 14). This wall 80 has a non-circular aperture 125 (such as of hexagonal form), press-fitted over a hexagonal hub 81. This hub 81 has a square aperture telescoping over a corresponding non-circular end 83 of the shaft 55. Accordingly, rotation of shaft 55 causes rotation of the chopping sleeve 79.

A series of slots 84 (Figs. 8, 9, 10, and 11) extend longitudinally through the chopping sleeve 79. These slots are narrow along the length of sleeve 79, and present cutting edges that cooperate with the edges of apertures 77 of the shut-off sleeve 78 (Fig. 9) as shaft 55 rotates. The chopped material passes through the slots into the interior of chopping sleeve 79. At the lower portions of the slots there are curved bottom walls 129 serving as sloping guides for the passage of the chopped material into the interior of sleeve 79.

Egress from the interior of chopping sleeve 79 is effected through a series of apertures 85 at the upper end of this sleeve (Figs. 8, 9, 10, 11, 13, and 14).

Figure 13:
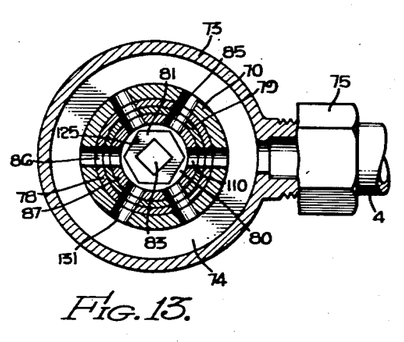
Fig. 13 is a sectional view, taken along a plane corresponding to line 13—13 of Fig. 9.
Figure 14:
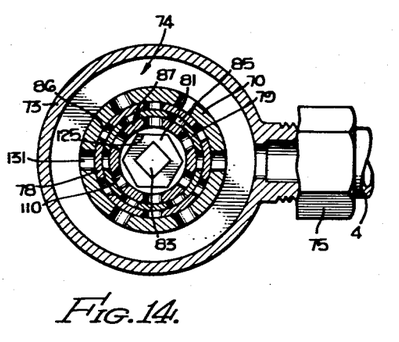
Fig. 14 is a sectional view, taken along a plane corresponding to line 14—14 of Fig. 11.

The upper end of the shut-off sleeve 78 is provided with a series of apertures 86 which can be made to register with the corresponding apertures 85 of chopper sleeve 79, or placed out of registry therewith. Fig. 13 illustrates the apertures in alignment, and Fig. 14 illustrates these apertures out of alignment. While the sleeve 78 is in the position of Figs. 8 and 13, flow of material into and out of the interior of the chopper sleeve 79 is permitted; and this material is forced by the pressure in cylinder spaces 2 and 3 into the sleeve 79 and outwardly through apertures 85. When the shut-off sleeve 78 is moved to the position of Fig. 14, the flow of material to the interior of sleeve 79 is prevented.

A supplemental shut-off sleeve 87, angularly movable with the sleeve 78, telescopes within the upper end of the rotating chopper member 79. This sleeve valve is provided with a series of apertures 110 that can be moved into registry with outlet apertures 131 of the body 70 (Fig. 13). When sleeves 78 and 87 are angularly adjusted to a proper position, as indicated in Fig. 13, the materials can proceed through the ports 67, 68, apertures 69 and 77, through slots 84, into sleeve 79, and then radially outwardly through the apertures 110 in member 87 to be further chopped by the chopper sleeve 79 and urged through the openings 86 of the sleeve valve 78, and finally through the openings 131 into the annular collecting chamber 74 of the collector 73.

Chopping occurs between the stationary member 87, as well as the sleeve member 78, by the interposition and rotation of the chopper sleeve 79. While pressure is exerted upon the material in the cylinder chambers 2 and 3, the material follows the path hereinbefore described, and is comminuted by the coaction of the edges of the sleeves 84 of the chopper sleeve 79 with the edges of apertures 77, the shut-off sleeve 78, as well as by the coaction between apertures 85 in sleeve 79 and apertures 110 and 86 of the shut-off sleeves 78 and 87. The mixing action is also augmented due to the fact that the materials are smeared by rubbing in the small clearance between the sleeves 78, 79, and 87.

The effect of this chopping and smearing action is that small particles of the materials are delivered into the chamber 74. These particles have thus been intimately intermixed by the combined effect of pressure, rubbing, and chopping that takes place within and through the sleeves 78, 87, and 79.

The sleeve valve 78 is attached, as by a cross pin 88, to a head 89 (Figs. 8, 9, 10, and 11). This head has a flange 93 contacting the upper edge of sleeve 78. The inner sleeve 87 is formed integrally with the head 89. At the upper end of the head 89, there is a conical shoulder 91 contacting a corresponding interior conical surface formed in head 72. In this way, axial movement of member 89 is restricted.

Head 72 is provided with an interrupted hollow cylinder 92 into which the upper cylindrical portion 94 of the head 89 projects. An ear 95 is integrally formed with portion 94. A handle 97 for adjusting the sleeve valves 78 and 87 is pivoted on this ear 95, as by a pin 132 passing through the clevis 96 formed at the end of handle 97. In the full-line position of Fig. 8, the handle has a limited angular movement defined by the side surfaces 133 (Figs. 10 and 12) of the hollow cylinder 92. This angular range corresponds to open or closed position of the shut-off sleeves 78 and 87. By movement of the handle 97 to the upright position shown in phantom lines in Fig. 8, the head 89 can be readily disassembled from the member 72.

For resiliently maintaining the handle 97 in either the active position or the upright position (shown in phantom in Fig. 8), use is made of a plunger 134 having a head 135 urged inwardly toward ear 95 by a compression spring 136. This compression spring is accommodated in a cylindrical recess 137 of handle 97. The head 135 is guided by this recess.

In the full-line position of Fig. 8, the head 135 contacts one of the edges of ear 95. In the phantom line position, the head 135 engages the top surface of the ear.

Figure 3:
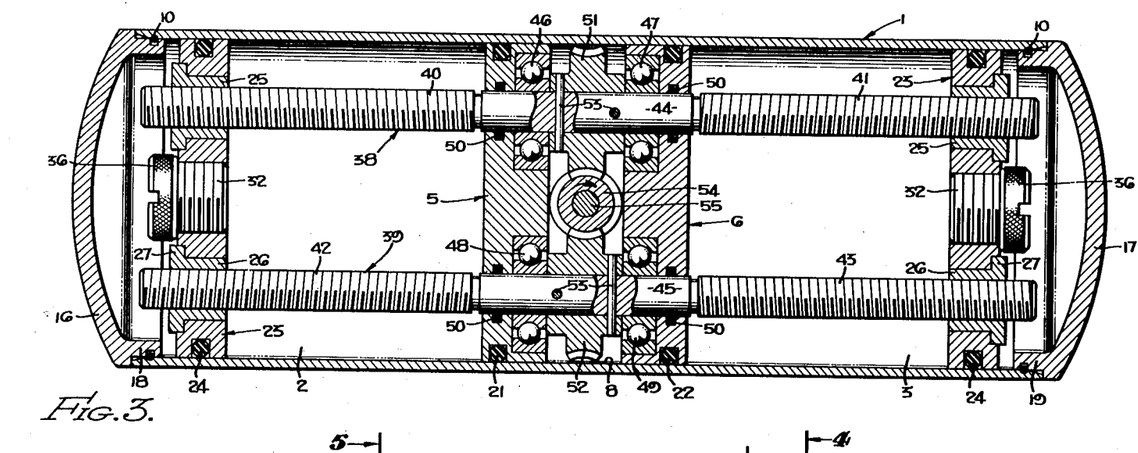
Fig. 3 is an enlarged sectional view, taken along a plane corresponding to line 3—3 of Fig. 2.

The lead screws 38 and 39 are rotated to bring the pistons 23 toward each other by the rotation of shaft 55 in a clockwise direction, as viewed in Fig. 3. Accordingly, the friction between the cylindrical surfaces of chopper sleeve 79 and the sleeve valves 78 and 87 (when sealing compound is contained between these surfaces) is such as to move the handle member 97 to the dot-and-dash position of Fig. 12. In this position, the sleeve valves are in open position, permitting the discharge of the comminuted mixture into the mixing chamber 74. However, manual movement of the handle 97 in a counterclockwise direction will close the apertures.

In operation, the materials to be mixed, such as the catalyzer and the rubber compound, are placed within the cylindrical spaces 2 and 3 through the piston openings normally closed by plugs 32. When it is desired to extrude a mixed compound through the nozzle 4, the trigger 66 is operated to rotate the transmission in the proper direction for forcing the materials from the cylinder spaces 2 and 3 into the interior of the chopper sleeve 79 via openings 69 and 77 and slots 84. The intermixed materials are then forced through the openings 110 in the sleeve 87, and are further chopped by shearing action of the edges of the relatively rotating apertures 110, 84, and 86, and smeared between the surfaces of sleeves 87, 79, and 78. They finally are urged by pressure into the collecting chamber 74 and thence to the nozzle 4.

This method of mixing is particularly effective for the tacky compound, as the chopper serves to separate the intermingled materials into small pieces which are then further intimately associated in the space between the surfaces of sleeves 87, 79, and 78. For practical purposes, the rate of rotation of the chopper 79, imparted to it by shaft 55, is of the order of 50 to 100 revolutions per minute.

Figure 15:
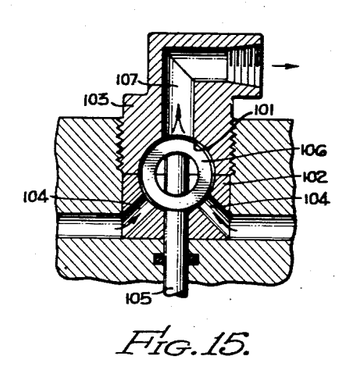
Fig. 15 is a fragmentary sectional view similar to Fig. 9 of a modified form of the invention.

In the form shown in Fig. 15, a spherical mixing chamber 101 is formed by two cooperating hemispherical cavities formed in an inlet body member 102 and an outlet body member 103. The inner and outer body members 102 and 103 are located in juxtaposed relationship. Inlet ports 104 lead from the cylinder spaces of barrel 1. An agitator shaft 105, the axis of which passes substantially through the center of the chamber 101, carries an annular or disk-like agitator 106. For proper mixing, the shaft 105 is rotated at about two hundred revolutions per minute. The beating action of the agitator 106 serves effectively to cut and intermingle the constituent parts, which ultimately pass through the outlet port 107. The shaft 105 must be quite rapidly rotated to produce the proper mixing action.

Figures 16, 17, 19:
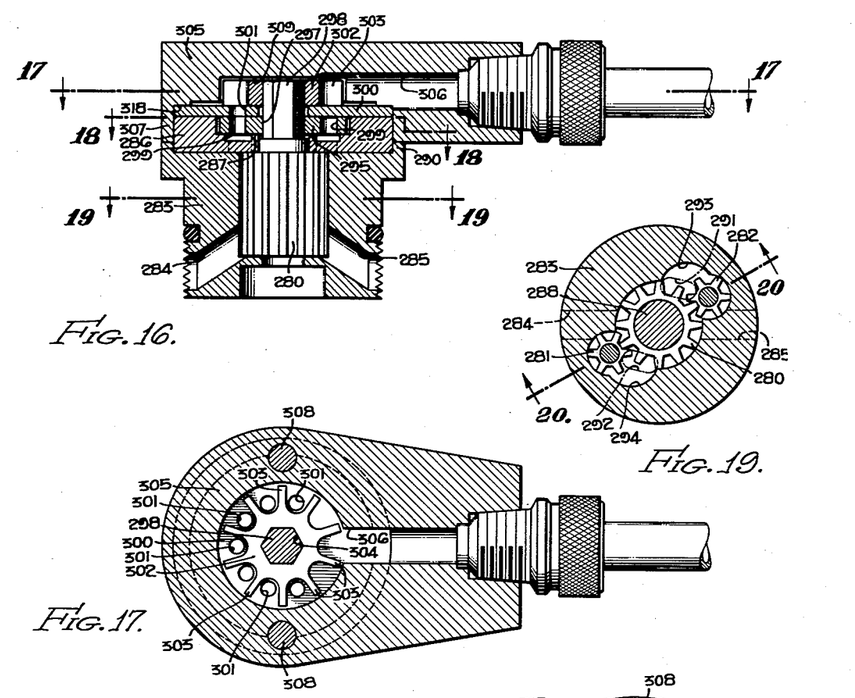
Fig. 16 is an enlarged vertical sectional view of another modified form of this invention.
Figs. 17, 18 and 19 are sectional views taken along planes indicated by lines 17—17, 18—18, and 19—19, respectively, of Fig. 16.

In the form illustrated in Figs. 16 to 20, a main gear 280 is provided with associated gear structure 281 and 282 (Fig. 19). These gear structures mix the material and reduce the pressure required to be developed by the pistons 23.

The main body member 283 in the present instance provides suitable longitudinally extending arcuate recesses for the gear structures 280, 281, 282, and provides the inlet openings 284 and 285 leading to these recesses. A plate 286 provides suitable bearings for shaft projections of all the gear members 280, 281, 282. For this purpose, the plate 286 has an apertured boss 287 receiving a cylindrical portion 288 integrally formed on the central gear 280. Recesses 289 (Fig. 20) receive the shaft extensions of the gear structures 281, 282.

Figure 18:
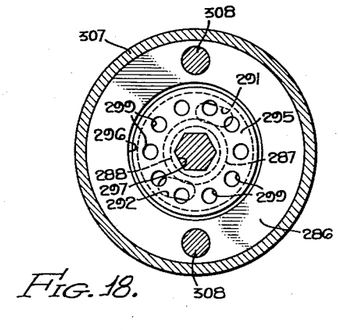
Figure 20:
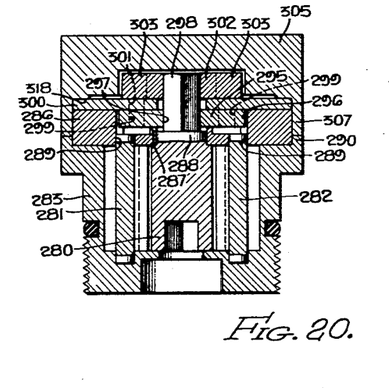
Fig. 20 is a sectional view taken along the plane indicated by line 20—20 of Fig. 19.
Figure 21:
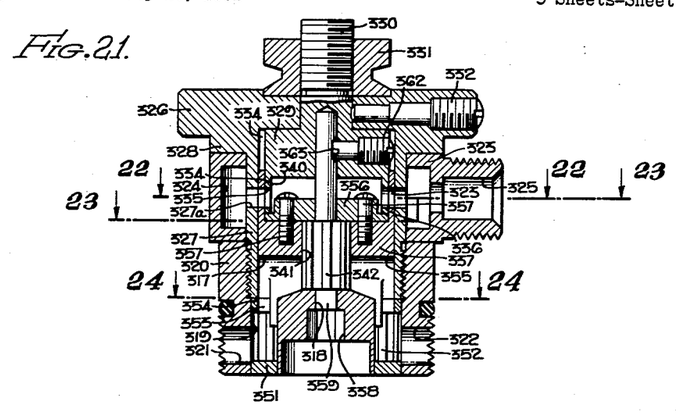
Fig. 21 is an enlarged vertical sectional view illustrating still another modified form of this invention.

An upwardly extending flange 290, formed on the body member 283, receives the plate 286. The material from the gear-toothed structure is permitted to pass centrally of the plate 286 by the aid of apertures 291 and 292, shown in phantom lines in Figs. 18 and 19. These plate apertures 291 and 292 register with appropriate passageways 293 and 294, respectively, of the main body member 283. These passageways 293 and 294 extend longitudinally of the body member 283. A small rotatable plate 295, shown most clearly in Fig. 18, is accommodated with a slight peripheral clearance in an annular recess 296 of the plate 286. The plate is carried by the main gear 280 for rotation therewith. For this purpose, the plate 295 has a non-circular aperture 297 telescoping over a corresponding non-circular shaft extension 298 formed integrally on the main gear 280.

The plate 295, as illustrated most clearly in Fig. 18, has a plurality of angularly spaced through apertures 299, through which the material may pass. The material may most easily enter the apertures 299 when they are brought into registry with the aligned recesses 291—293, or 292—294. A stationary plate 300 cooperates with the rotary plate 295 to aid in mixing the material, and has a series of angularly spaced through ports 301 that intermittently register with ports 299 of the rotating plate 295. Accordingly, the material may pass longitudinally through the plates 295 and 300 through paths that are continuously being changed and interrupted.

A rotatable cutter 302, superimposed on the stationary plate 300, produces a further chopping of the material. This cutter 302 is in the form of a vane structure, vanes 303 extending radially beyond the apertures 301 to insure that all of the material passing through the apertures 301 receive the benefit of the cutting action of the cutter member 302. For rotating the cutter 302 for cooperation with the stationary apertured plate 300, it is provided with a non-circular aperture telescoped over projection 298 of the gear member 280.

A cap member 305 cooperates with the body member 382 to provide an annular chamber for the mechanism above the gear pump structure. For this purpose, it has an annular flange 307 abutting the flange 290 of the body member. The cap member has a recess 309 accommodating the cutter 302. A shoulder 318 is formed inwardly of the flange 307. The stationary plate 300 is received within the flange 307 of the cap 305, and rests against the shoulder 318. The flange 307 telescopes over a portion of the bearing plate 286.

An outlet passageway 306 is provided in the tap member 305 that extends into the cutter recess 309. This outlet passageway 306 extends substantially radially of the annular chamber for the cutting mechanism.

For securing the cap 305 to the body member 283, a pair of bolts 308 pass longitudinally through the cap member 305 into appropriate threaded apertures of the main body member 283. These bolts also pass through the stationary plate 300 and bearing plates 286, determining proper alignment therefor.

Contact of all of the material intended to be mixed, with the cutter 302 is ensured by providing the apertures 301 of the stationary plate 300 at only a portion of the periphery thereof. Thus, that portion of the plate 300 that is nearest the outlet passage 306 is devoid of apertures. Accordingly, none of the material can pass directly from an aperture 301 to the outlet 306, but must be urged into the outlet 306 by the cutter 302.

In the form illustrated in Figs. 21 to 25, another form of a mixer utilizing a gear pump construction is illustrated. A main body member 320 serves as the main housing for the mixing apparatus and is threadedly accommodated in the halves 5 and 6. The main body member has radially extending inlet ports 321 and 322 that establish communication to a through axial bore 319 of the body member. A cap member 326, having an annular flange 327, cooperates with the body member 320 to define a housing. The lower end of flange 327 is threadedly received in the upper portion of the bore 319 of the body member 320. A rotary member 357 is telescopingly received in the flange 327 of the cap 326. This rotary member mounts a gear construction through which the material must pass.

Figures 22, 23:
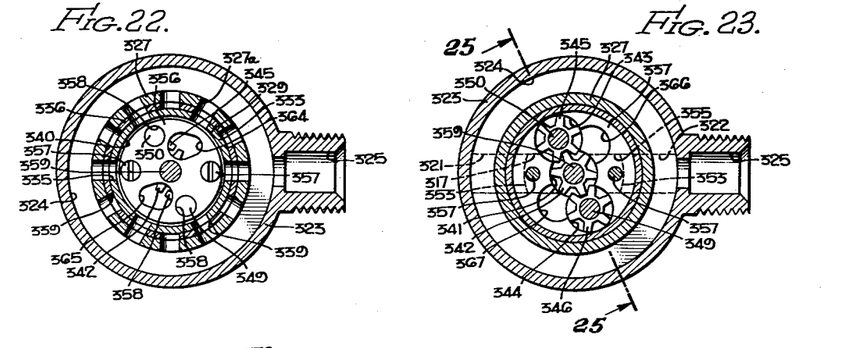
Figs. 22, 23 and 24 are sectional views taken along planes indicated by lines 22—22, 23—23, and 24—24, respectively, of Fig. 21.
Figure 24:
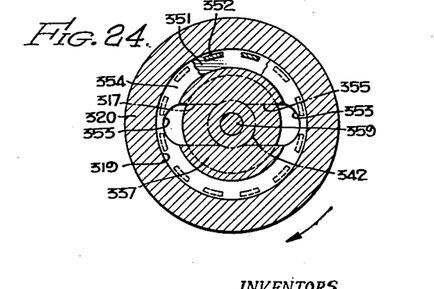
Figure 25:
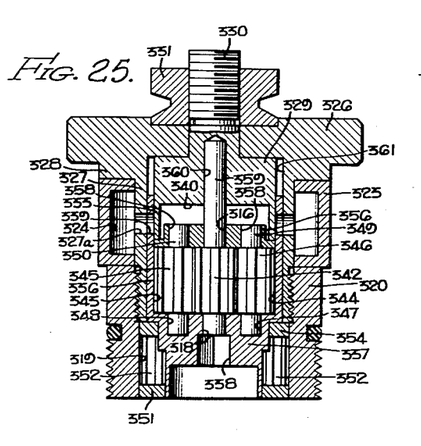
Fig. 25 is a sectional view taken along the plane indicated by lines 25—25 of Fig. 23.
Figure 26:
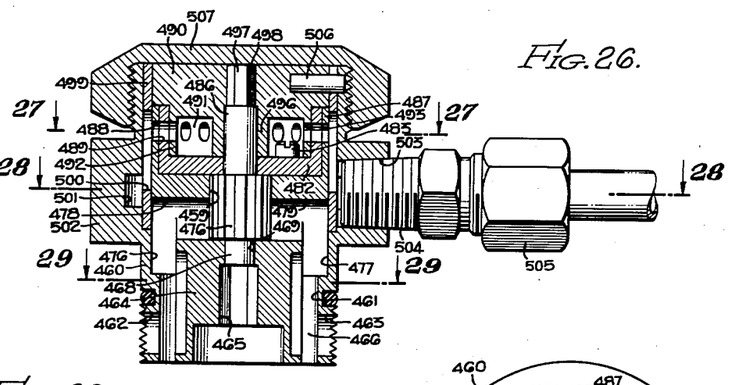
Fig. 26 is an enlarged vertical sectional view of still another modified form of this invention.

As illustrated in Fig. 23, the rotary member 337 has a cylindrical recess 341 centrally thereof, opening upwardly of the rotary member, accommodating a non-rotary gear 342. On opposite sides of the central recess 341, and similarly opening upwardly of the rotary member 337, are arcuate slots 343 and 344 that intersect the cylindrical bore 341. Inserted in these arcuate slots 343 and 344 are rotary gear structures 345 and 346, as shown in Fig. 25 that are in engagement with the central gear 342. The rotary member 337 provides piloting recesses 347 and 348 for the lower ends of shafts 349 and 350 of the gear structures 346 and 345, respectively. The rotary member 337 also has a cylindrical recess 318 receiving the lower end of the shaft 359 of the non-rotary gear 342.

An annular cage 352 is carried on the lower portion of the rotary member 337 and has angularly spaced, longitudinally extending slots between upper and lower flanges 354 and 351 of the cage 352, respectively. The cage 352 defines an inner annular space surrounding the lower portion of the rotary member 337. The material from the inlet ports 321 and 322 passes into the cage, the cage producing an initial mixing. A pair of arcuate slots 353 is formed in the upper flange 354, as shown most clearly in Figs. 21 and 24, at diametrically opposite sides thereof. These arcuate slots are in registry with radially extending passageways 355 and 317 in the rotary member 337. Accordingly, the material from the inside of the cage 352 can pass upwardly into these passageways 355 and 317, via slots 353.

As shown by the dotted lines in Fig. 23, the passageway 317 intersects the arcuate recess 343 for the gear structure 345 and the cylindrical recess 341 for the main gear 342. The passageway 355, however, intersects the arcuate slot 344 for the gear 346, as well as the cylindrical recess 341 opposite the passageway 317.

A plate 356 is secured to the rotary member 337 by the aid of screws 357. As shown most clearly in Figs. 39 and 42, this plate provides piloting recesses 358 for the upper ends of the shafts 349 and 350 of the rotary gear structures 345 and 346. The plate also has a central cylindrical aperture 316 piloting the upper elongate extension of the shaft 359 of the non-rotary gear structure 342.

The material entering the gear structures through passageways 317 and 355 can pass upwardly of the rotary member 337 by the aid of appropriate ports 364 and 365 (Fig. 22) of the plate 356 that register with arcuate recesses 366 and 367 (Fig. 23) in the rotary structure 337. These recesses are at the upper portion of the rotary member 337, and receive the material after acted upon by the gear structures.

The rotary member 337 is rotated by the aid of a non-circular recess 338 in the bottom of the member 337. Assuming, for the present, that the central gear 342 is held against rotation, then a clockwise direction of rotation of the rotary member 337, as viewed in Fig. 23, will impart a planetary motion to the gear structures 345 and 346. The material entering the passageway 317 will then be carried arcuately around the passageway 343 and upwardly therein. The material then passes into the recess 366. Similarly, the material entering the passageway 355 is carried arcuately around the recess 344 by the gear 346 and finally to the recess 367. Some of the material from the passageway 317 may be diverted from the arcuate slot 343 by the stationary gear 342. Similarly, some of the material from the passageway 355 may be diverted from the arcuate slot 344 by the gear structure 342. A thorough mixing is thus produced. Also, as in the previous forms, the gear structures act as a pair of tandem pumps, whereby the pressure required to be developed by the pistons 23 can be materially reduced.

A collector member 323 has an annular recess 324 receiving the material that has been acted upon by the gear structures. The material in the recess 324 can pass to the nozzle structure by the aid of a radially extending outlet passageway 325 formed on the collector member. The collector member 323 is held in assembled relationship against the top of the main body structure 320 by the aid of an annular flange 328 in the cap member 326 that engages the upper portion of the collector 323.

A stationary member 329 is carried by the cap member 326, as by the aid of a threaded extension 330 projecting through the cap 326 and engaged by a lock nut 331. The stationary member 329 has an annular flange 333 spaced inwardly of the flange 327 of the member 326. It forms an annular space 334 between the flanges. The flange 333 of the inner stationary member 329 forms a chamber 340 receiving the material from the gear structure and passing through the plate 356.

The material can pass outwardly of the flanges 333 and 327 by the aid of a series of radially extending apertures 327a and 335 in the flanges 327 and 333, respectively. These radial ports are in pre-set alignment with each other, as by the aid of a set screw 332 carried by the outer member 326 and engaging the extension 330 of the inner flange member 329. The annular recess 324 of the collector member 323 is in communication with the ports 327a of the outer flange 327.

To produce a further admixture of the material, a cutting and smearing action is achieved by an upwardly extending annular flange 336 integrally formed on the rotary member 337 that extends into the annular space 334. As shown most clearly in Fig. 22, this flange 336 has a series of angularly spaced ports 339 that intermittently register with the ports 327a and 335 of the inner and outer stationary flanges 333 and 327, respectively.

For holding the central gear structure 342 against rotation, a set screw 362, carried by the inner non-rotary member 329, engages a flat portion 363 of the upper elongate extension of the shaft 359.

In the form illustrated in Figs. 26 to 30, an arrangement is provided that is somewhat similar to the form illustrated in Figs. 21 to 25. The present form utilizes a series of apertured sleeves and flanges that are relatively rotatable. It also utilizes a gear pump construction to mix the material and reduce the pressure required to be developed by the pistons 23.

Figure 30:
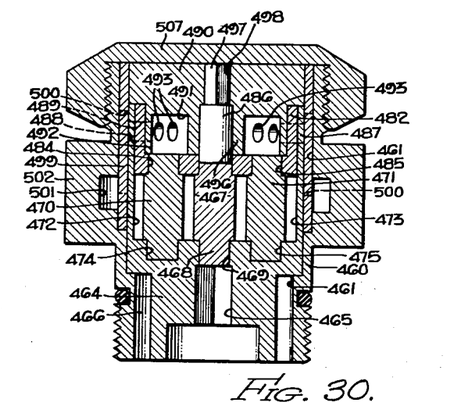
Fig. 30 is a sectional view taken along a plane indicated by line 30—30 of Fig. 28.

A main body member 460 is threaded at its lower end for reception by the halves 5 and 6. This main body member 460 has a longitudinal bore 461 in which the grinding and mixing mechanism is received. The material is admitted to the bore 461 by inlet ports 462 and 463. A rotary member 464 is received in the bore 461. It has an appropriate non-cylindrical recess 465 by which it is rotated. The rotary member 464 has a substantial clearance with respect to the bore 461 at the inlet openings 462 and 463 (Fig. 30). Accordingly, an annular space 466 is formed that communicates with the inlet openings 462 and 463.

A non-rotary main gear 467 is supported in a recess 459 (Figs. 26 and 28) in the rotary member 464 substantially axially thereof, and opening in the upper face of member 464. This main gear 467 has a lower shaft extension 468 piloted in a cylindrical recess 469 of the rotary member. Associated with the main gear member 467 are a pair of rotary gear structures 470 and 471 (Figs. 28 and 30) that are supported in appropriate recesses 472 and 473 of the rotary member 464. These rotary gear structures are in engagement with the main gear 467 on opposite sides thereof. Recesses 474 and 475 in rotary member 464 receive shaft extensions of the rotary gear structures 470 and 471.

The material from the inlets 462 and 463 is brought into the recesses of the gear structures by the aid of a pair of longitudinally extending slots 476 and 477 (Figs. 26 and 29) on diametrically opposite sides of the rotary member 464. A pair of radially extending slots 478 and 479, as shown most clearly in Fig. 26, communicate with the slots 476 and 477, respectively, at one end. The transverse passageway 478 opens into the recesses 472 and 459 of the gear structure 470 and main gear 467. The transverse passageway 479 opens into the recess 473 for the gear 471, as well as the main gear recess 459 opposite the passageway 478. Longitudinally extending outlet passageways 480 and 481, opening upwardly of the rotary member 464 (Fig. 28), are angularly displaced from the inlet passages 478 and 479, and receive the material urged therein by the gear structures 470 and 471, respectively.

The main gear 467 is prevented from rotating by a structure to be hereinafter described. Assuming a clockwise rotation of the rotary member 464, it is apparent that the gear structures 470 and 471 carry the material about their respective recesses 472, 473 from the passageways 478 and 479 into the outlet passages 480 and 481. The main gear 467, being stationary (Fig. 28), diverts some of the material in the passage 478 from the gear structure 470 and urges it, instead, into the passageway 481. The main gear structure 467 in a similar manner diverts some of the material from the transverse passage 479 from the gear 471 and, instead, into the passageway 480. A substantial intermixture of the material is thus effected.

Figure 27:
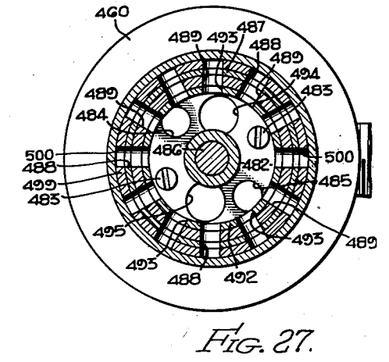
Figs. 27, 28 and 29 are sectional views taken along planes corresponding to lines 27—27, 28—28, and 29—29 of Fig. 26.
Figure 28:
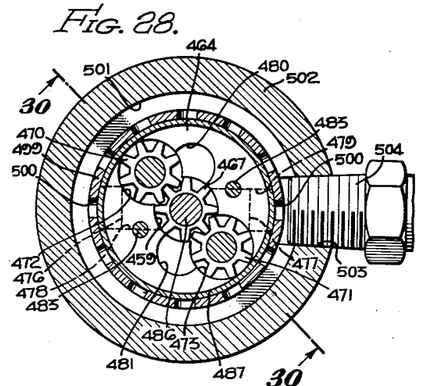
Figure 29:
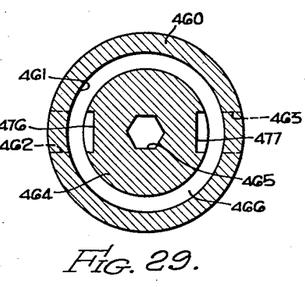

A cup member 482 (Fig. 30) is secured to the rotary member 464 by the aid of screws 483 (Figs. 27 and 28), and provides piloting recesses 484 and 485 (Fig. 30) for the upper ends of the rotary gear structures 470 and 471. An upper shaft extension 486 of the main gear 467 also passes through the cup 482. The rotary member 464 has an upwardly extending annular flange 487 (Figs. 27 and 30) that is provided with angularly spaced apertures 488 (Fig. 27). The cup 482, rotatable with the member 464, has equiangularly spaced apertures 489 in its flange that are continuously in alignment with the apertures 488 of the rotatable member 464.

A stationary flange member 490 cooperates with the cup 482 to define an upper annular chamber 491. For this purpose, the stationary member 490 has a depending flange 492 telescopingly received by the cup member 482. This flange 492 has a series of equiangularly spaced through apertures 493 that intermittently register with the apertures 488 and 489 of the rotating members 464 and 482.

Fig. 27 illustrates a position in which the ports 488, 489, and 493 are in registry. The material from the gear structure passes into the chamber 491 through apertures 494 and 495 (Fig. 27) in the bottom of the cup 482 that are in registry with the outlet passages 480 and 481 (Fig. 28) of the rotating member 461, respectively. The material thus may pass outwardly of the chamber through the ports 488, 489, and 493 when they are in partial or total registry.

The stationary flange member 490 has a sleeve 496 telescopingly accommodating the cylindrical shaft extension 486 of the main gear 467. The shaft extension 486 has a non-circular or hexagonal portion 497 accommodated in a corresponding recess 498 of the stationary flange member 490. The flange member 490 is held stationary by means to be hereinafter described. Accordingly, the main gear structure, by the non-circular recess 498 and corresponding non-circular portion 497, is held against rotation. Rotation of the member 464 thus causes the planetary movement of the gears 470 and 471.

Telescopically received in the main body member 460 and surrounding the rotatable flange 487 is a non-rotary cutter member 499 (Fig. 26) in the form of a sleeve. This cutter member 499 has a series of angularly spaced, longitudinally extending holes 500 that intermittently register with the apertures 488 of the rotary flange 487. The material entering the sleeve slots 500 may then pass downwardly of the non-rotary cutter member 499 into an annular collecting recess or channel 501 provided in a flange 502 of the main body member 460. The flange 502 has an interiorly threaded aperture 503 forming the outlet from the mixing mechanism. A threaded projection 504 of a coupling member 505 is received in this outlet 503.

For holding the stationary flange member 490, cutter member 499, and main gear 467 against rotation, a pin 506 is provided that extends transversely through the cutter 499 and at one end into the non-rotary flange member 490. At the other end the pin 506 is accommodated in an aperture provided in the main body member 460. A cap 507 closes the upper end of the main body member 460.

The inventors claim:

1. In a mixer structure: a stationary apertured sleeve; a rotary apertured sleeve, the apertures being alternately brought into and out of registry as the rotation of the rotary sleeve progresses; an angularly movable sleeve valve having corresponding apertures and located between the other two sleeves and in frictional contact with the rotary sleeve; and means forming stops for limiting movement of the sleeve valve between open and closed positions; the said sleeve valve being urged by frictional drive by the rotary sleeve toward open position.

2. In a mixer: a body member having inlet and outlet ports, said body having means forming a passage between the inlet and outlet; said body also having a chamber forming a part of said passage; a rotary gear structure interposed in said passage, and about which the material to be mixed must pass; a rotary plate extending across said chamber, said rotary plate having a series of through openings; a rotary cutter in said chamber; and a non-rotary plate interposed between said cutter and said rotary plate, said non-rotary plate contacting said cutter and said rotary plate on opposite sides of said non-rotary plate, said non-rotary plate having a series of apertures intermittently aligned with the apertures of said rotary plate.

3. In a mixer: a body member having a substantially annular chamber, said body member having an outlet passage, the axis of which extends substantially normal to the axis of said annular chamber, said outlet passage communicating with said chamber at one side thereof and at one end thereof; said body having means forming an inlet passage communicating with the other end of said chamber; a gear structure interposed in one of said passages, and about which the material to be mixed must pass; a circular rotary plate extending across said chamber, said rotary plate having a plurality of through apertures substantially uniformly distributed around said rotary plate; a cutter vane in said chamber; and a non-rotary plate between said cutter vane and said rotary plate, said cutter vane and said rotary plate contacting opposite sides of said non-rotary plate; said non-rotary plate having apertures intermittently registrable with said through apertures of said rotary plate, said apertures of said non-rotary plate being located at that side of said non-rotary plate remote from said outlet passage.

4. In a mixer: a body member having an inner annular recess, an outlet communicating with said recess, and an inlet; an outer non-rotary member having a flange extending into said body member and defining a chamber inwardly of said annular recess; an inner non-rotary member having a flange within the flange of said outer non-rotary member, and defining therewith an annular space, said inner non-rotary member being secured to said outer non-rotary member; a rotary member having an annular flange extending into said annular space, said rotary member having a passageway in continuous communication with said inlets at one end, and communicating with said chamber at the other end; and a gear structure in said passageway and through which the material to be mixed must pass; said flanges of said inner and outer non-rotary members having a plurality of angularly spaced through apertures that are in continuous alignment; said flange of said rotary member having a series of through apertures intermittently registrable with said apertures of said non-rotary members; said apertures of said members, when in registry, establishing communication between said chamber and said annular recess.

5. In a mixer: a body member having an inner annular recess, an outlet communicating with said recess, and an inlet; an outer non-rotary member having a flange extending into said body member and defining a chamber inwardly of said annular recess; an inner non-rotary member having a flange within the flange of said outer non-rotary member, and defining therewith an annular space, said inner non-rotary member being secured to said outer non-rotary member; a rotary member having an annular flange extending into said annular space, said rotary member having a pair of passageways in continuous communication with said inlet at one end, and communicating with said chamber at the other end; a gear structure in said passageways, comprising a non-rotary gear member carried axially of said rotary member, said rotary member having a recess for accommodating said non-rotary gear member, a pair of rotary gear members in engagement with said non-rotary gear member on opposite sides thereof, said rotary member having recesses for accommodating said rotary gear members; each of said passageways communicating with the recesses for said rotary gear members respectively; said rotary member forming another annular space in communication with the passageways and communicating with the inlet; and a cutter sleeve having a plurality of longitudinally extending slots in said other annular space.

6. In a mixer: a body member having an inner annular recess, an outlet communicating with said recess, and an inlet; a non-rotary cutter sleeve extending into said body member and defining a chamber inwardly of said annular recess; an outer non-rotary member having a flange extending into said cutter sleeve; an inner non-rotary member having a flange within the flange of said outer non-rotary member, and defining therewith an annular space, said inner non-rotary member being secured to said outer non-rotary member as well as to said cutter sleeve; a rotary member having an annular flange extending into said annular space, said rotary member having a pair of passageways in continuous communication with the inlet at one end, and in communication with said chamber at the other end; a gear structure in said passageways, comprising a non-rotary gear member carried axially of said rotary member, said rotary member having a recess for accommodating said non-rotary gear member, a pair of rotary gear members in engagement with said non-rotary gear member on opposite sides thereof, said rotary member having recesses for accommodating said rotary gear members; each of said passageways communicating with the recesses for said rotary gear members respectively.

7. In a mixer structure: a support having a recess; a body member having a head and a sleeve projecting from the head that is detachably mounted at the recess; said sleeve having two axially spaced sets of apertures, one of the sets of apertures being located within the support recess and the other of the sets of apertures being located above the recess; said support having means forming a plurality of separate inlets communicating with the peripheral portions of at least some of the apertures of said one set; a collector member annularly surrounding the apertures of said other set, and providing an outlet; a hollow chopper member within the sleeve having peripherally located apertures movable into and out of alignment with the apertures of both of said sets; material passing between the inlets and the outlet being constrained to pass into and out of said hollow chopper member; and a shaft mounted on the support and projecting into said recess for continuously rotating said chopper member.

8. The combination as set forth in claim 7 together with a valve sleeve interposed between the chopper member and the body member sleeve, said valve sleeve having two sets of apertures capable of simultaneous registry with the sets of apertures of said body member sleeve, and movable to a position in which none of the apertures of the respective sleeves register; and means extending through the body member and connected to said valve sleeve whereby said sleeve may be positioned.

9. In a mixer structure: a support having a recess; there being a pair of inlets opening into the bottom of the recess; inner and outer body members together fitting the recess, and placed in juxtaposed relationship therein, each of said body members having a hemispherical cavity, the cavities together defining a spherical mixing chamber; a rotary shaft mounted on the support and projecting through the inner body member and into said chamber; the axis of the shaft passing substantially through the center of said spherical mixing chamber; and an agitator disk mounted on the shaft, and having a diameter substantially equal to that of the chamber; the axis of the shaft being substantially parallel to the plane of the agitator disk; the inner body member having means forming ports from said inlets and opening in the chamber at places spaced from the axis of said shaft whereby said disk produces a shearing action with respect thereto; said outer body member having means forming an outlet from said chamber and leading outwardly of said support recess.

References Cited in the file of this patent

UNITED STATES PATENTS

| 1,611,452 | Johnson | Dec. 21, 1926 |
| 2,169,338 | Ditto | Aug. 15, 1939 |
| 2,619,330 | Willems | Nov. 25, 1952 |
| 2,641,453 | Teale | June 9, 1953 |
| 2,688,470 | Marco | Sept. 7, 1954 |

FOREIGN PATENTS

| 572,665 | Great Britain | Oct. 18, 1945 |

UNITED STATES PATENT OFFICE
CERTIFICATION OF CORRECTION

Patent No. 2,963,736 December 13, 1960

Floyd E. Snow et al.

It is hereby certified that error appears in the above numbered patent requiring correction and that the said Letters Patent should read as corrected below.

In the grant, lines 3 and 13, and in the heading to the printed specification, lines 5 and 6, name of assignee for "Coast Pro-Seal Mfg. Co.", each occurrence, read -- Coast Pro-Seal & Mfg. Co. --.

Signed and sealed this 23rd day of May 1961.

(SEAL)
Attest:

ERNEST W. SWIDER
Attesting Officer

DAVID L. LADD
Commissioner of Patents